United States Patent
Erikkalä

(10) Patent No.: US 8,477,987 B2
(45) Date of Patent: Jul. 2, 2013

(54) METHOD FOR REPOSITIONING A NUMERICALLY CONTROLLED DEVICE

(75) Inventor: Jouni Erikkalä, Espoo (FI)

(73) Assignee: Sime Oy

( * ) Notice: Subject to any disclaimer, the term of this patent is extended or adjusted under 35 U.S.C. 154(b) by 973 days.

(21) Appl. No.: 11/921,636

(22) PCT Filed: Jun. 19, 2006

(86) PCT No.: PCT/FI2006/000216
§ 371 (c)(1),
(2), (4) Date: Dec. 5, 2007

(87) PCT Pub. No.: WO2006/136649
PCT Pub. Date: Dec. 28, 2006

(65) Prior Publication Data
US 2009/0129633 A1    May 21, 2009

(30) Foreign Application Priority Data
Jun. 22, 2005   (FI) ...................................... 20050681

(51) Int. Cl.
*G06K 9/00*   (2006.01)
(52) U.S. Cl.
USPC ............................ 382/100; 382/154; 700/259
(58) Field of Classification Search
USPC .................................. 382/154, 181; 348/148
See application file for complete search history.

(56) References Cited

U.S. PATENT DOCUMENTS

| 6,681,151 | B1 * | 1/2004 | Weinzimmer et al. | ........ 700/259 |
| 6,801,653 | B1 * | 10/2004 | Wu et al. | ....................... 382/154 |
| 7,336,805 | B2 * | 2/2008 | Gehring et al. | ............... 382/104 |
| 2003/0151664 | A1 * | 8/2003 | Wakimoto et al. | ............ 348/148 |
| 2005/0002558 | A1 | 1/2005 | Franke et al. | |

FOREIGN PATENT DOCUMENTS

| EP | 0388618 | 7/1990 |
| EP | 0668237 | 10/1995 |
| EP | 0885833 | 3/1998 |
| JP | 07-291582 | 11/1995 |
| JP | 9216736 | 8/1997 |
| JP | 2000-255978 | 9/2000 |
| WO | WO8702484 | 4/1987 |

\* cited by examiner

*Primary Examiner* — Hadi Akhavannik
(74) *Attorney, Agent, or Firm* — Skinner and Associates

(57) ABSTRACT

The invention relates to a method for repositioning a numerically controlled device by using an image taken of an object as an aid. According to the method, the system is taught in such a way that a child image is defined for the camera's image, either its own set of co-ordinates is formed for the element or a set of coordinates is retrieved from elsewhere, and the image thus obtained, together with its co-ordinates, is stored in the data system, and, in the repositioning situation, the real-time image is compared with the child image stored in the data system, in order to determine the real-time position of the imaging device relative to the stored image. The set of co-ordinates used is a set of co-ordinates retrieved using satellite positioning, or the device's own internal set of co-ordinates. In the repositioning situation, the image stored in the teaching situation is sought as the co-ordinate point of the image stored in the memory is approached.

11 Claims, 3 Drawing Sheets

METHOD FOR REPOSITIONING A NUMERICALLY CONTROLLED DEVICE

The present invention relates to a positioning method, and more specifically to a method for repositioning a numerically controlled device.

At present, various techniques are used in the positioning of goods, articles, and other objects. At their simplest, they are based on direct visual observations and on operating according to the conditions in the field of vision.

In some situations, a crane driver, for example, cannot see the position into which he should place his load. In such situations, a radiotelephone connection is often used between the crane driver and a person at the position. The person at the position gives the crane driver instructions for the positioning of the load. Standardization of direction and other instructions is important to ensure the correct transmission of the instructions, so that the instructions given will produce a good result in terms of the location of the load.

A more highly developed version of the above also comprises one or more cameras, with the aid of which a load can be quite precisely set in position.

When a specific position must be found again, or a specific article or object repositioned, the methods are even more highly developed. In such cases satellite-based positioning methods, for example, are used. One example is disclosed in U.S. Pat. No. 909,394, in which satellite positioning is used to guide a crane to travel over paths differing slightly from each other, to prevent the formation of wheel ruts.

In the applicant's own earlier invention, which is disclosed in U.S. Pat. No. 6,256,553, a transmission system is presented, which exploits a video image and specific identifiable reference points for identifying the initial and final positioning locations.

The present invention is intended, for example, to expand and make more precise the placing of the load and specifically its repositioning, and to introduce for use numerous new applications, the use of which has previously been impossible, at least with sufficient precision.

The aforementioned advantages and benefits are achieved in the manner stated to be characteristic in the accompanying claims.

In brief, in the method according to the method, an image-processing technique based on machine vision and modern computer data processing are used simultaneously with various devices for numerical positioning, in the repositioning of a product or location. This creates significant new possible applications and productive technical solutions.

The invention also discloses how the position of the target relative to an image of the real-time camera view is shown simply on the driver's display.

On account of its construction, the invention is applicable to very many fields, as the basic requirement of the method is the possibility to itemize data on the basis of numerical information. The source of the numerical information can be the device's own co-ordinate system, satellite positioning systems, such as the USA's Global Positioning System (GPS) or the future European GALILEO, or a local numerical X/Y map of the information that the camera sees at each moment, created with the aid of the machine vision used in the invention itself.

The essential features of the invention are the ability to distinguish each location individually, the individualization of the location, and the retrieval of a child image from the memory in connection with repositioning. Once each location has been distinguished from other places it is possible to refer again to the location in positioning, once the co-ordinates of the numerically positioned device at the time are known. The numerical positioning sets of co-ordinates referred to above and the devices controlled using them typically represent Numeric Controls (NC). If an identifier is linked to each position datum, the individual image information seen by the camera at that point can, with the aid of a child image, improve the repositioning of the numerically controlled device, by using the child image according to the invention in parallel with the numerical control and the state data, linked to the child image, of the numerical positioning device.

Particularly when approaching a product or location, defects has been found in the numerical control of machines and devices, which, if not corrected, will prevent the automation of future functions. It is known that disorganization is tending to increase everywhere. In the case of machine vision, a traditional camera and the traditional individual analysis of the camera image have start from a setup, in which some object to be sought later is taught in 'standard conditions', in which the lighting, distance, and imaging-angle are the same or nearly constant. These basic assumptions lead to the machine vision becoming less usable as disorganization increases. Machine vision traditionally uses a circuit card (PCB) to detect similar products repeatedly, but completely new problems then arise on account of colours, dents, and similar factors in the detection of similar intermodal containers used in transportation.

The invention is based on transmitting to a camera a continuous video or similar image flow in a specific known co-ordinate point, by means of which from somewhere in the continuous image flow of the camera a single image is first of all taken, and which is stored in the memory of the data system by tying the image to a momentary location, when the device is being taught, or to position data (several). The memory is typically a database (DataBase DB) and its table (Table T) in one record (Record R) in the record set (RecorSet RS), and to a register data record (Item I) in it. The increased storage capacity of data systems permits the storage of even large information sets, such as images.

Several typical properties and state data for the device being controlled are stored in the record of the image being stored, thus permitting the stored image to be repositioned.

For example, the following data are stored as image data in the memory of the data system: image information in a numerical form, the camera source, the states of the zoom lens, the size of the image, its location in the entire image, the time, X/Y/Z/R/S/Q states, the GPS or GALILEO position, in addition the compass direction, the interest (Region Of Interest ROI)/lack of interest (Don't care), the name and additional information for the user, additional option for machine vision OCR, MEASUREMENT (edge/stripe), and whether graphical positioning is to be used in parallel with numerical, etc.

Later, when it comes again approaches numerical co-ordinates used previously in the data system, the data system retrieves from the memory the image-element record from the entire image-element record set that is the closest, or the closest in the correct direction of approach, which it has been previously taught, according to the position data at the time. The image-record sets can all be in a single set, or stored in their own separate sets according to some quality criterion: product number, stacks, areas, tools, etc.

In a closer search of an image file in X/Z/R/S control, it is possible to use a derivative of the Theorem of Pythagoras, which can take the form $$\text{MIN}(\sqrt{((X^{image}-X^{prent})^2+(Y^{image}-Y^{present})^2+\text{etc.})}),$$

in which

MIN=select the smallest value
$X^{image}$=position data X at the moment of teaching the image
$X^{present}$=position data X at the positioning device of the camera now
$Y^{image}$=position data Y at the moment of teaching the image
$Y^{present}$=position data Y at the positioning device of the camera now, etc.

If only two co-ordinates, the X and Y co-ordinates, are selected for comparison, the selection takes place on one plane. If a third co-ordinate Z is added, the selection of the child image takes place three-dimensionally, when normal device co-ordinates are referred to.

In GPS and GALILEO positioning, typical X and Y co-ordinates would be the latitude and longitude values, into which the device's own altitude data could be inserted on account of the less accurate altitude data of the systems, because the altitude data of the positioning systems referred to above are quite approximate.

Some features of the invention are illustrated with the aid of the accompanying drawings. Thus:

Figure 1:
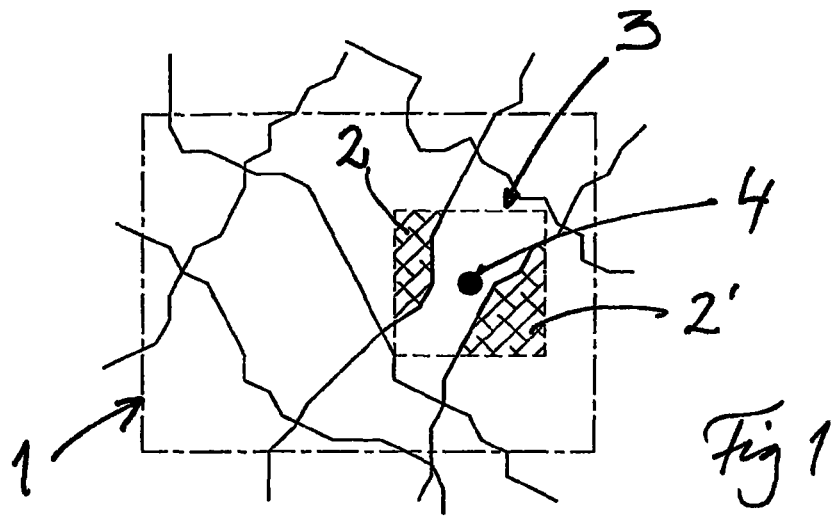
FIG. 1 shows a hypothetical area seen by the camera, in a situation in which it is stored in the memory of the system.

In brief, FIG. 1 shows an area 1 seen by the camera, in which there are features that can be identified. Such features are, for example, the hatched areas 2 and 2' inside the selected child image 3. The point 4 inside the image area is selected as a fixed point. In this case, the point 4 is also the centre point of the child image, but this is in no way essential. This image can be seen on the display device and the selection of the image area and other operations can be carried out from the display. This image is stored in the memory of the system.

Figure 2:
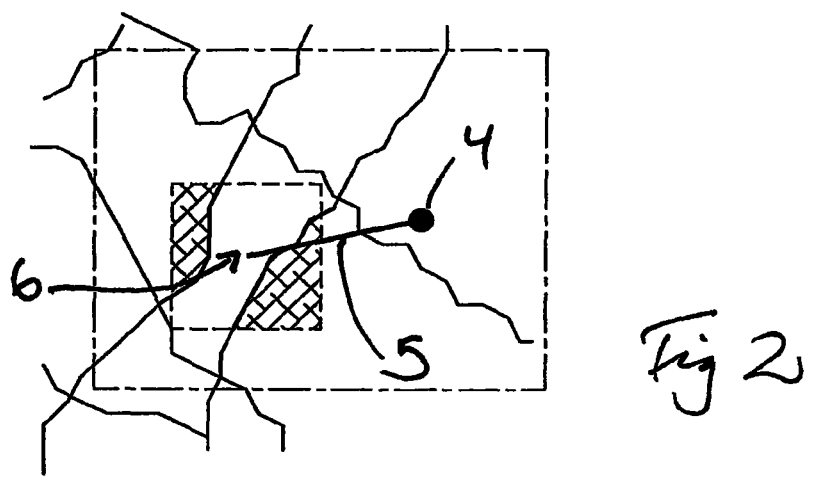
FIG. 2 shows a situation, in which the aforesaid stored view is being sought again for repositioning.
Figure 3:
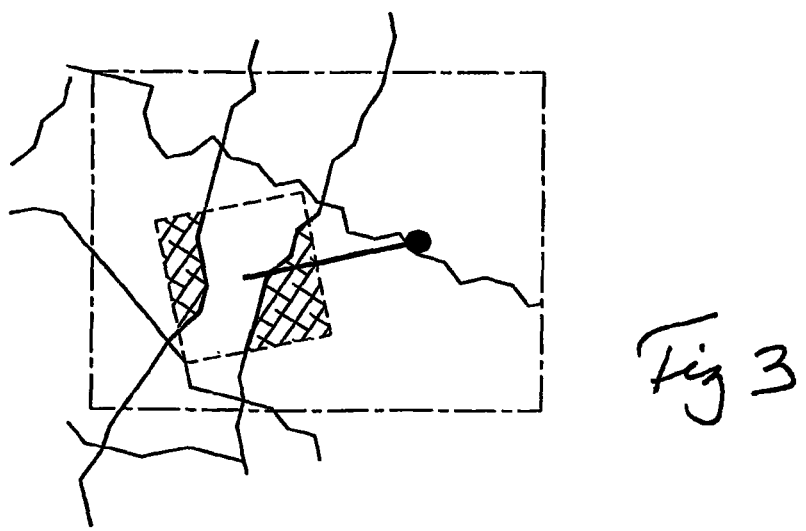
FIG. 3 shows the situation according to FIG. 2, but in this case the camera must seek it from a position rotated relative to the area.

FIGS. 2 and 3 show situations in which the stored object is being sought again. In practice, this takes place by the camera imaging the whole time that it is moving (on the boom of a crane, or, for instance, on a vehicle), using the parameters of the recording situation while searching for the stored object, while approaching the object according to the co-ordinates stored in the system. In FIGS. 2 and 3 the object has been found, in FIG. 2 it is in essentially the same direction as in the recording situation, but to the side of it, while in FIG. 3 it is also to the side but the direction of approach too differs from that in the recording situation.

In FIGS. 2 and 3, a 'rod' 5 can be seen, by means of which the system shows how far from the recording situation the recorded object is now when it has been found. The ball at the end of the rod 5 signifies the point 4 of FIG. 1 while the other end 6 is located at the point corresponding to point 4 of the found image. It is obvious that repositioning can be performed easily and precisely with the aid of such an illustrative image.

Figure 4:
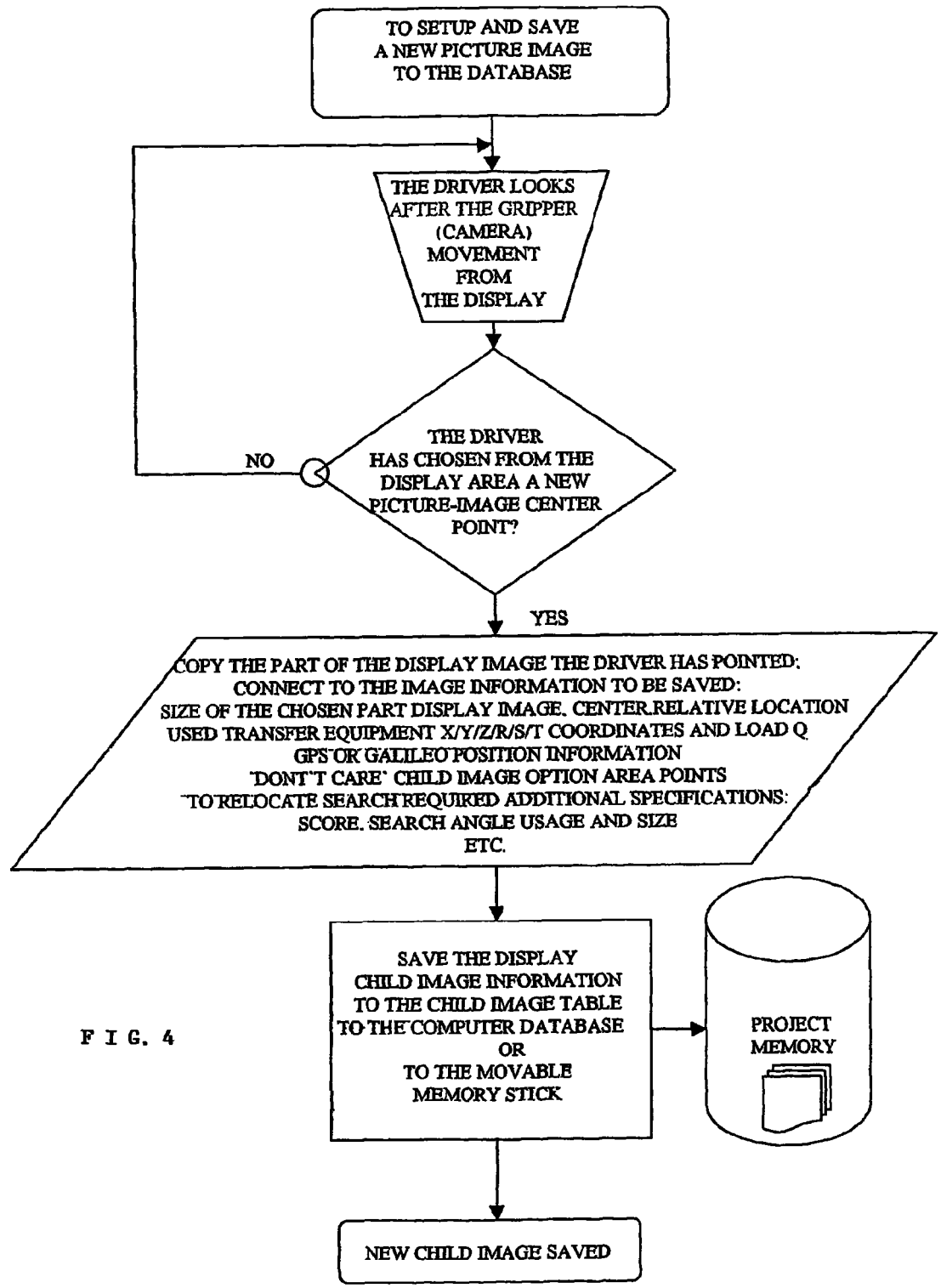
FIG. 4 shows a flow diagram of the recording situation shown in FIG. 1.
Figure 5:
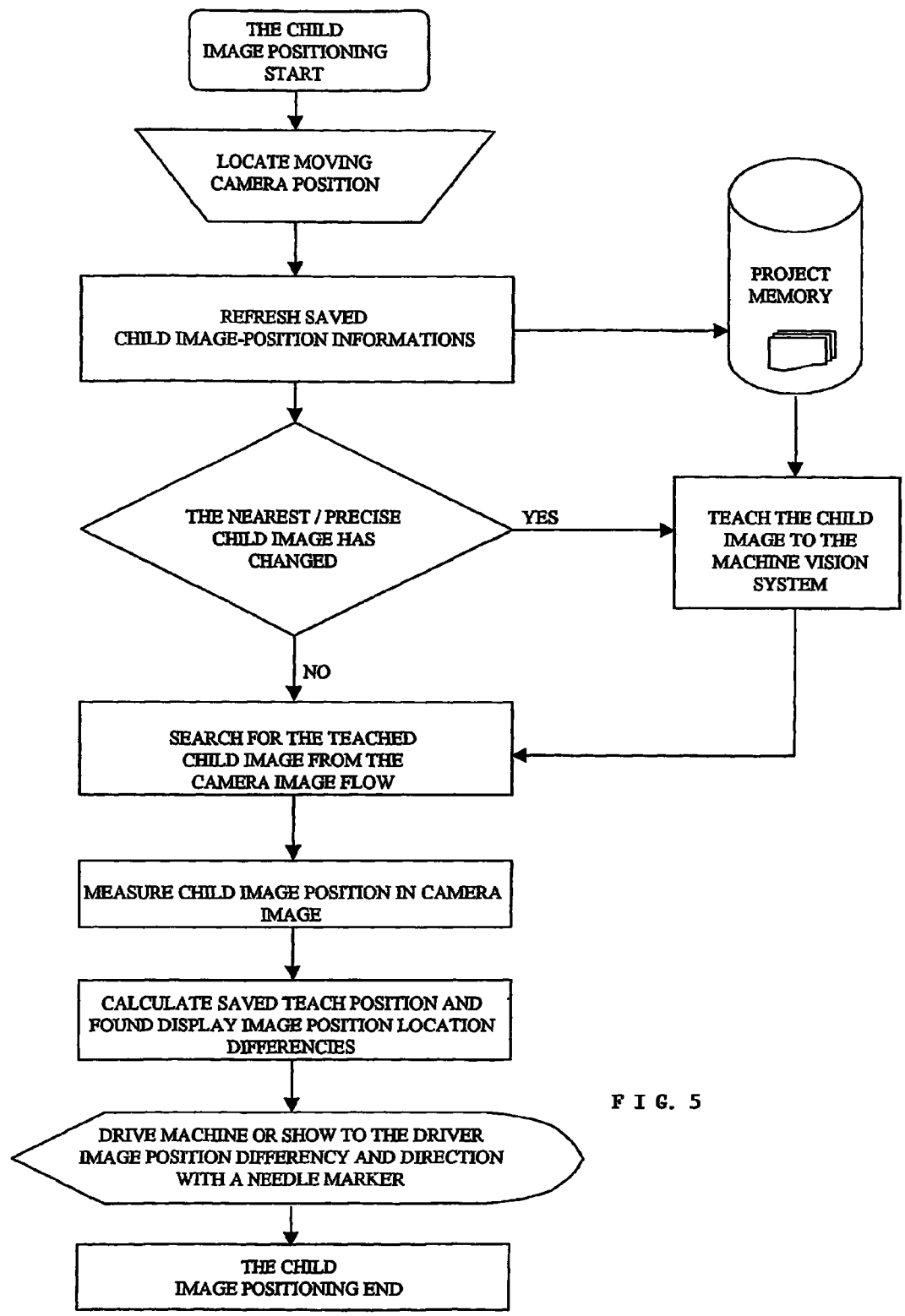
FIG. 5 shows in turn a flow diagram on the search situation.

FIGS. 4 and 5 show, as stated above, flow diagrams of both the recording situation (FIG. 4) and the search situation (FIG. 5). The flow diagrams are clear and self-explanatory.

A particular advantage of the invention lies in its flexibility in learning the child images to be sought, as well as a qualitative improvement in the positioning result of even an approximate positioning system. According to the GPS standard, the positioning accuracy of the GPS system is at least in the order of 22 meters in the horizontal level, but is typically better. The positioning accuracy is influenced by the satellites used in the system appearing simultaneously to the positioning antenna.

Operation of the European GALILEO will start in about 2008. The positioning accuracy of the closed service levels of the GALILEO system will provide a global 1-meter precision while locally precision of an order of even 0.10 meters will be achieved.

The accuracy of the public positioning systems (OS) will be 4 meters in the horizontal plane and 8 meters in the vertical plane at two frequencies. Using Galileo and the system according to the invention together, the positioning of a tower crane typically used in construction work can be implemented globally directly according to the designer's drawings.

The invention can also be used to improve the position given by a GPS positioning device, for instance the positioning of a ship used in scheduled service to its port locations. If, in addition, two different camera angles, which are in the direction of travel and in the lateral direction, are used, a GPS positioning device can be used to perform both approach and precise positioning using the arrangement according to the invention, for instance, using the fixed features of the harbour buildings and the dock elements. The arrangement according to the invention can also be used to eliminate the variations due to high and low tide, so that bascule-bridge operations can be automated according to the requirements of increased flows of materials.

In addition, when loading a ship the change in the displacement of the ship can be corrected, in order to accelerate loading and unloading. When a ship docks in flowing water, the force of the water can be eliminated using image processing according to U.S. Pat. No. 6,256,553, in which one image and an child image of it are taken. After a specified period of time a second image is take and the aforementioned child image is sought from it. Once the child image has been found, the distance of movement of the latter child image can be determined and when the time between the taking of the two images in known the docking of the ship along with the flow can be regulated precisely.

Automatic container-handing equipment is being used increasingly in ports. Due to the large structures of cranes, imprecisions in positioning, and changes in external conditions, such as wind, the softening and rutting of asphalt, improvements can be made in asks arranged according to the invention in the positioning of products, thus making operations more efficient. In addition, when automating large lifting devices in ports, the structures have had to be made more sturdy, because the intention has been to eliminate deflections in the devices themselves. By means of the arrangement according to the invention, improvements can be made and advantages gained in both the lightening of the structures and in approaches made to a position, in which the tolerances in the motors used to move the structures, the deflections in the structures, and errors in the possible fall of the base of container stacks can be corrected with the aid of the arrangement according to the invention.

As the feet and hands of the driver of a tower or mobile crane on a building site are taken up with controlling the crane and the driver concentrates on following the transfer of goods either himself by following it with his gaze or waiting for control commands by radio, even without the image-element positioning possibilities the use of the arrangement according to the invention will give a considerable increase in the efficiency of the work, while also improving work safety by increasing the observation possibilities of the driver.

If graphical positioning is selected, the image-processing equipment will search for the next closest or specified child image from the real-time image area, the image flow, imaged by the camera/positioning device.

When the child image 3 (in FIGS. 1-3) taught by the driver is found, the control system displays the taught and found child image on the display to the driver, dividing the real image directly on the display in the image flow by a line (5 in FIGS. 2 and 3) between their two points. One end of the line in at the defined point in the teaching situation child image and the other end is at the same point in the corresponding child image found in the image flow stream. The display of the line of the screen gives the driver a clear and simple way to locate the direction in which he should guide the crane, in order to achieve the taught point. The location of the child image can be selected by the driver himself, but when moving large objects, the target element should be situated in such a way as to permit the desired control and adjustment. On the other hand, the teaching should be carried out from the structure in the surroundings that remains the most constant. In some difficult transfer tasks, the driver can follow the movement of the load relative to the crane he is driving.

If graphical positioning is not selected, changing the camera from one to another, the possibility to use security cameras used in site surveillance, and setting the zoom lens to correspond to the teaching situation, will already as such accelerate and give additional safety to the driver's activities, because the driver can concentrate the whole time on driving the crane. The imaging angle is the optimal image angle in the location in question, selected by the driver himself. The zoom lens is adjusted automatically, which limits the correct image area. Any camera whatever in the area, including surveillance-camera information, can be selected.

If it is possible to use the site-surveillance cameras too, the cameras monitoring the gates to the building site can also be used to aid the crane driver. This is a particular advantage in cramped building projects in city centres, in which the positioning of the crane is restricted. Thus considerable additional value will be given to the entrance-gate cameras, if their possibilities according to the invention are taken into account in positioning them. On the other hand, the working possibilities of the crane driver will become more comprehensive.

If wireless image-transfer methods are used with the cameras, the signals of all the cameras on the building site can be used to obtain advantages in the control of several cranes, by the positioning of the antennae of the cameras and the careful planning of the location of the receiver antennae on the cranes. Thus the image from a tower crane could be exploited both in site-surveillance tasks after working time, and in a surveillance system built into the apparatus according to the invention.

If the numerical control system of the device is automatic, the automation system will receive information on the position and direction of the child image taught the first time, relative to the teaching situation in the real-time image flow. When the found child image corresponding to the previously taught child image is in the real-time image at the same point as in the teaching situation, the location of the camera and positioning device will correspond to the teaching situation.

In industry, in positioned automatic cranes, which are used for the internal management of material flows, the use of the arrangement according to the invention will achieve the positioning required in individual production, in which, in addition to numerical positioning, repositioning will be ensured for retrieval, with the aid of an child image taken in connection with the deposition of the product in the warehouse.

When the arrangement according to the invention is used, more precise positioning and a reduced risk of damaging products will be achieved.

The invention claimed is:

1. A method for repositioning a crane, moving material handling equipment, and other numerically controlled devices, in a system including a camera imaging device, a storage data system, and an operator display screen by using an image taken of an object in the field of vision of the operator of the numerically controlled device as an aid, the method including a step to teach the system first by defining a child image from the imaging device, by forming a set of coordinates pertaining to the properties or state data for the numerically controlled device, the set of coordinates including a fixing point of the child image, and recording the child image, together with the co-ordinates in the data system, and the system later repositioning by comparing a real-time image from the imaging device with the child image stored in the data system, in order to determine the real-time position of the imaging device relative to the stored child image, by displaying the taught child image and real-time image on the operator display screen, and by superimposing a substantially straight line on the operator display screen depicting a measured distance between the fixing point of the child image and a fixing point of the real-time image, whereby the line is adapted to show the direction in which the numerically controlled device is repositioned, characterized in that, in the repositioning step, the image stored in the teaching step is sought when the coordinates of the real-time imaging device first comes close to the co-ordinate point of the child image stored in the data system.

2. Method according to claim 1, characterized in that, in the repositioning step, the real-time image is compared with the child image stored in the data system, in order to determine the real-time position of the imaging device relative to the position of the stored child image on the display screen and in the set of coordinates.

3. Method according to claim 1, characterized in that the set of co-ordinates includes co-ordinates retrieved using satellite global positioning system.

4. Method according to claim 1, characterized in that the set of co-ordinates includes the numerically controlled device's own internal co-ordinates.

5. Method according to claim 1, characterized in that, in the teaching step, at least image information in a numerical form, the size of the image, X/Y/Z/R/S/Q states, and its location in the entire image are stored in the data system.

6. Method according to claim 1, characterized in that, in the repositioning step further comprising the step of defining a distance of the closest stored image point to be searched for, relative to present, real-time positioning data of the camera imaging device, using the equation $$MIN(\sqrt{((X^{image}-X^{present})^2+(Y^{image}-Y^{present})^2+etc.)}),$$

in which
- MIN=select the smallest value
- $X^{image}$=position data X at the moment of teaching the image
- $X^{present}$=position data X at the camera now
- $Y^{image}$=position data Y at the moment of teaching the image
- $Y^{present}$=position data Y at the camera now.

7. Method according to claim 1, characterized in that the taught child image is selected from any image area imaged by the camera imaging device.

8. Method according to claim 1, characterized in that child images are selected from at least two camera imaging devices.

9. Method according to claim 1, characterized in that data is transferred by wireless means between the camera imaging device and the storage data system.

10. Method according to claim 8, characterized in that two or more cameras are used.

11. Method according to claim 10, characterized in that switching between the image source of the cameras is performed automatically, according to the co-ordinate point.

* * * * *

UNITED STATES PATENT AND TRADEMARK OFFICE
CERTIFICATE OF CORRECTION

PATENT NO. : 8,477,987 B2  
APPLICATION NO. : 11/921636  
DATED : July 2, 2013  
INVENTOR(S) : Jouni Erikkilä

Page 1 of 1

It is certified that error appears in the above-identified patent and that said Letters Patent is hereby corrected as shown below:

Title Page, Item (12) "Erikkalä" should read --Erikkilä--.

Title Page, Item (75) Inventor: "Jouni Erikkalä" should read --Jouni Erikkilä--

Signed and Sealed this  
Twentieth Day of August, 2013

Teresa Stanek Rea  
*Acting Director of the United States Patent and Trademark Office*